United States Patent [19]

Albanese

[11] Patent Number: 5,321,442
[45] Date of Patent: Jun. 14, 1994

[54] EYEGLASSES WITH DETACHABLE LENSES, SIDEBARS, AND ADJUSTABLE EARPIECES

[76] Inventor: Gerry M. Albanese, 523 Civic Dr. #C, Walnut Creek, Calif. 94596

[21] Appl. No.: 841,064

[22] Filed: Feb. 25, 1992

[51] Int. Cl.[5] .............................. G02C 7/10
[52] U.S. Cl. ........................ 351/44; 351/86; 351/154; 351/158
[58] Field of Search ............ 351/158, 86, 154, 41, 351/44, 106, 51, 52

[56] References Cited

U.S. PATENT DOCUMENTS 3,565,517  7/1965  Gitlin ........................ 351/106
3,610,742  10/1971  Page ........................... 351/86
4,021,103  5/1977  Gaspari ........................ 351/86
4,070,103  1/1978  Meeker ....................... 351/154
5,054,903  10/1991  Jannard et al. ............... 351/111

Primary Examiner—Bruce Y. Arnold
Assistant Examiner—Hung Xuan Dang

[57] ABSTRACT

Non-prescription and or prescription glasses and or sunglasses having a single metal or plastic frame and a plurality of interchangeable, removable or replaceable lenses, temple side bars, temple ornaments, color beaded lenses and adjustable earpiece. Lenses of different colors and shapes are magnetically attached to the frame. Temple side bars and ornaments of different colors and shapes are snap-fitted to the frame.

10 Claims, 3 Drawing Sheets

EYEGLASSES WITH DETACHABLE LENSES, SIDEBARS, AND ADJUSTABLE EARPIECES

FIELD OF THE INVENTION

The present invention relates to a new concept in sunglasses which allows lenses and side bars to be easily changed and earpieces to be adjusted.

DESCRIPTION OF THE PRIOR ART

Numerous prior patents have provided changeable parts for eyewear, such as U.S. Pat. No. 4,958,923 issued to A. S. Rosenson directed to removably affixing a decorating member to an eyeglass frame member, U.S. Pat. No. 4,950,066 issued to J. Hartman directed to interchangeable, decorative elements for eyeglasses, U.S Pat. No. 4,798,455 issued to C. S. Yoe directed to separable eye frame and side bars of a variety of designs and U.S. Pat. No. 3,709,587 issued to M. I. Wick directed to a means for interchanging lenses of varying sizes and shapes.

None of the above referenced patents, considered either singly or in combination, is seen to suggest the instant invention as claimed.

SUMMARY OF THE INVENTION

Today, most people own a pair of sunglasses. Most of these sunglasses were purchased primarily as a fashion statement. If these sunglasses become lost, broken or out of style, the owner is forced to buy another pair of limited use and expensive sunglasses which will inevitably suffer the same fate as the first pair. One pair of sunglasses offers little variety to the wearer and are difficult to color coordinate with outfits.

Accordingly, one object of the present invention is to provide a pair of non-prescription and or prescription glasses and or sunglasses that will allow the buyer to wear many types of sunglasses while using a single base frame.

A second object of the present invention is to provide a pair of sunglasses which have easily interchangeable lenses.

A third object of the present invention is to provide a pair of sunglasses in which the lenses are magnetically attached to the frame.

A fourth object of the present invention is to provide a pair of sunglasses which have easily interchangeable temple side bars.

A fifth object of the present invention is to provide a pair of sunglasses in which various side bars and or decorative ornaments are snap-fitted to the temple piece of the frame.

A sixth object of the present invention is to provide a pair of sunglasses lenses of different shapes and shades as well as lenses that are a different shape than the frame rims.

A seventh object is to provide a pair of sunglasses equipped with non detachable and adjustable earpieces so one frame size fits all wearers.

A final object of the present invention is to provide a pair of sunglasses which can change along with fashion, styles, can be color coordinated with clothing and can adapt to the different needs of the user depending on the time or location of use.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 9A:
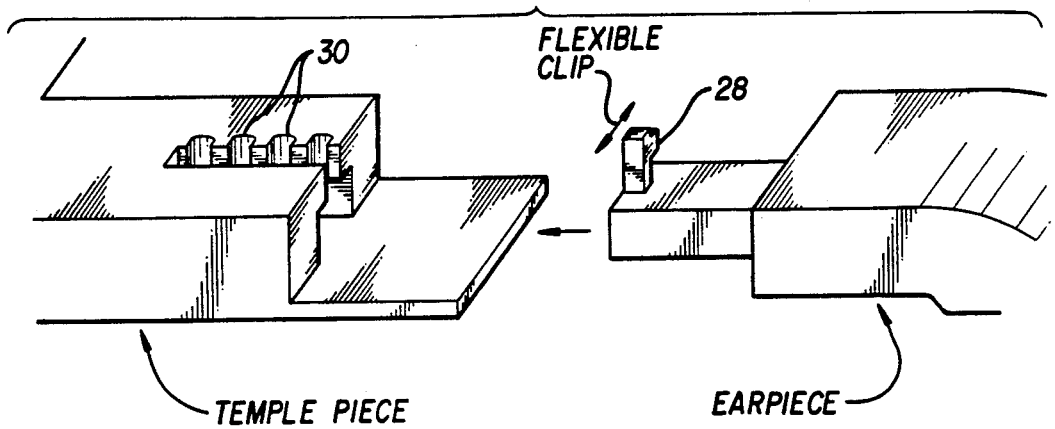
FIGS. 9A and B show how the earpieces are made to be adjustable.
Figure 9B:
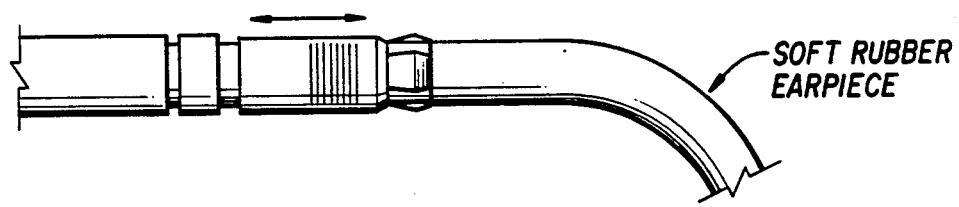

Referring to the drawings, and particularly to FIGS. 1-5 thereof, there is shown a pair of sunglasses generally indicated by reference numeral 20. The sunglasses 20 comprise a frame member which includes two circular eyepieces 2 pivotally and permanently connected to two frame temple pieces 4. The frame members may be metal or plastic or both. Two soft rubber or plastic, adjustable earpieces 10 are attached to the two frame temple pieces. The earpieces include a flexible clip 28 which fits into and cooperates with detentes 30 in the temple side pieces 4. Such cooperation provides for longitudinal adjustment of the earpieces 10 along the temple side piece 4 as illustrated in FIG. 9. The sunglasses 20 also include two removable lenses 6. These lenses may be glass or plastic.

When the frame rim member is made of metal, the lens 6 is attached to a circular eyepiece 2 by means of magnets or a series of magnetic inserts 12 epoxied into and or around the circumference of the lens itself. The magnet 12 will easily attach the lens 6 to the metal eyepiece as clearly shown in FIG. 4.

Figure 4:
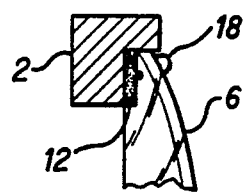
FIG. 4 is a view of the lens attached to a metal frame.
Figure 5:
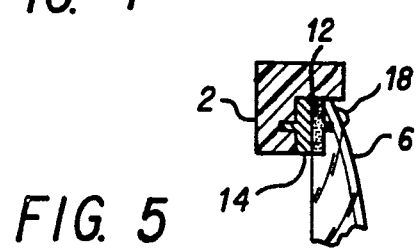
FIG. 5 is a view of the lens attached to a plastic frame.

If the frame and eyepiece 2 are made of plastic, as shown in FIG. 5, the eyepiece 2 will include a metal insert 14 to cooperate with magnet 12 embedded in lens 6. The lenses may be of various colors and shades. Additionally, the lenses may include a plastic or rubber color bead 18 as shown in FIGS. 4 and 5. The bead is glued or engraved to the outer front surface and around the perimeter of lens 6. Note that the beads may vary in design and color.

Figure 1:
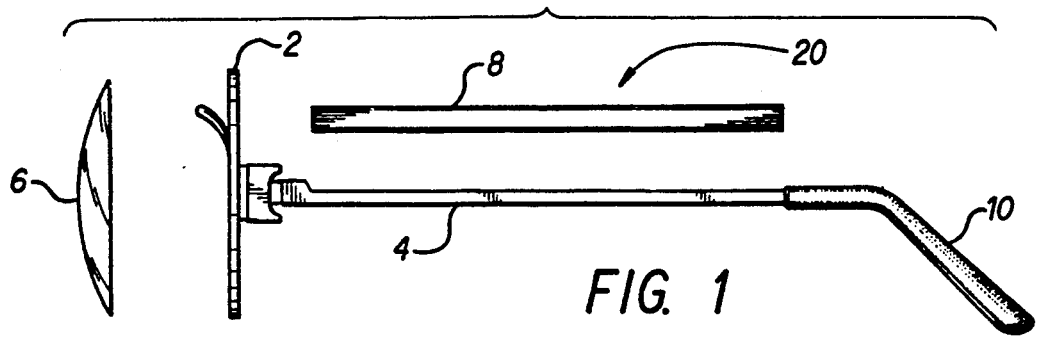
FIG. 1 is an exploded view of one embodiment of the present invention.
Figure 2:
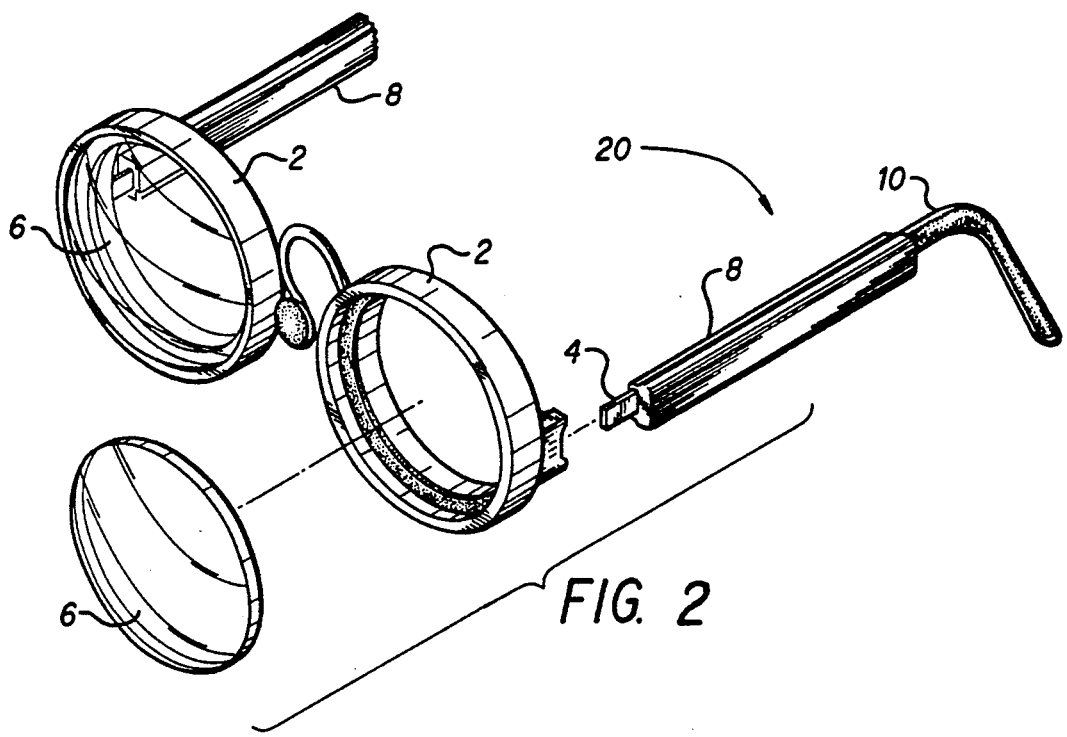
FIG. 2 is a view of the embodiment of FIG. 1 when fully assembled.
Figure 3:
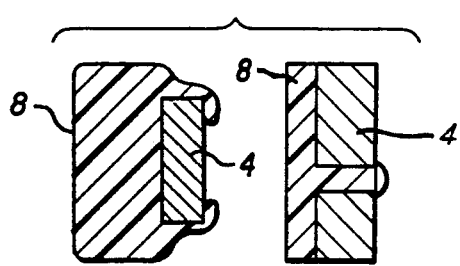
FIG. 3 is a view showing how temple side bars and decorative ornaments are snap-fitted to the frame.

The temple side bars and ornaments 8 which are made of rubber or plastic snap or slip on and off of the frame temple pieces 4 in the manners clearly illustrated in FIG. 3. The temple side bars and ornaments 8 may also be of various sizes, colors and designs as shown in FIG. 8.

Figure 6:
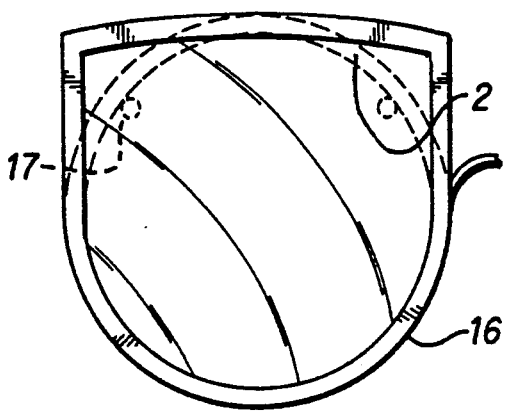
FIG. 6 and 7 show a lens having a shape different from the rim attached to the frame.
Figure 7:
Figure 8A:
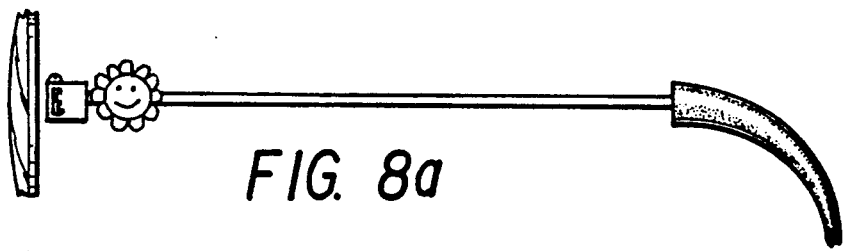
FIGS. 8A–8E show samples of temple side bars and ornaments.
Figure 8B:
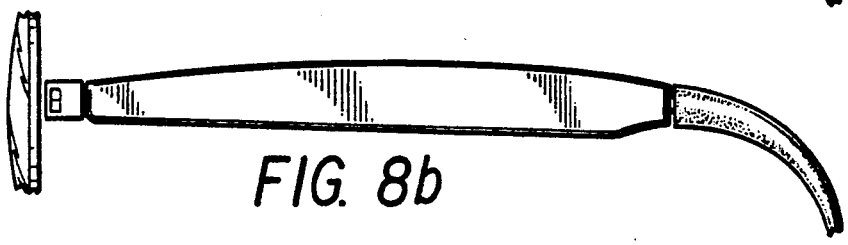
Figure 8C:
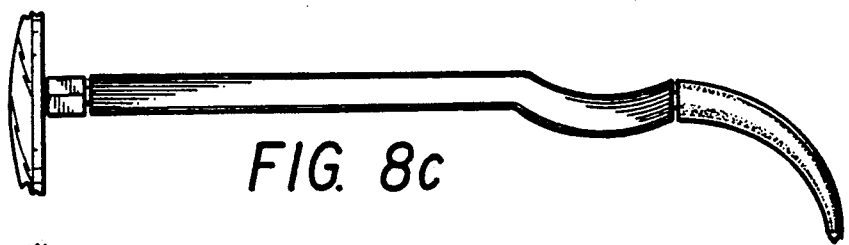
Figure 8D:
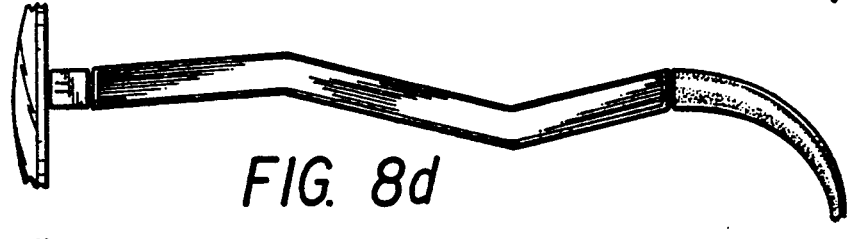
Figure 8E:
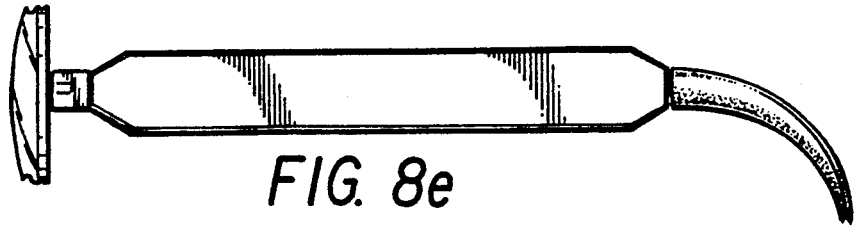

Referring now to FIG. 6 and 7, there is shown a lens 16 having a different shape from the circular frame eyepiece 2. The lenses 16 include studs 17 on the back side thereof, and are attached to frame eyepiece 2 by magnets 12 in a manner similar to the lens 6. The studs are meant to stabilize the lenses to the frames.

The present invention makes it easy to change the appearance of sunglasses in a relatively inexpensive manner.

It is to be understood that the present invention is not limited to the sole embodiment described above, but encompasses any and all embodiments within the scope of the following claims.

What is claimed as new and desired to be secured by Letters Patent is:

1. A pair of fashion sunglasses comprising in combination: an eye frame member including two circular eyepieces pivotally attached to two frame temple pieces; two removable lenses attached to said eyepieces, wherein said lenses include magnetic inserts expoxied into the circumference of said lenses and two side bars snap-fitted to said frame temple pieces, said frame temple pieces having two longitudinally adjustable earpieces.

2. The sunglasses of claim 1, wherein said lenses are made of glass.

3. The sunglasses of claim 1, wherein the lenses are made of plastic.

4. The sunglasses of claim 1, wherein said eyepieces and said frame temple pieces are made of plastic.

5. The sunglasses of claim 4, wherein said plastic frame temple pieces and said plastic eyepieces include metal inserts.

6. The sunglasses of claim 1, wherein said side bars are made of soft rubber or plastic.

7. The eyeglasses of claim 1, wherein said lenses are of a shape different from that of said frame eyepieces of said frame member.

8. The sunglasses of claim 1, wherein said lenses may be various colors and shades.

9. The sunglasses of claim 1, wherein the lenses include color beads glued to an outer surface and around a perimeter thereof.

10. A pair of fashion sunglasses comprising in combination: an eye frame member including two circular eyepieces pivotally attached to two frame temple pieces; two removable lenses attached to said eyepieces, wherein said lenses include magnetic inserts epoxied around the circumference of said lenses, and two side bars snap-fitted to said frame temple pieces, said frame temple pieces having two longitudinally adjustable earpieces.

* * * * *